(12) United States Patent
Suzuki et al.

(10) Patent No.: US 9,971,097 B2
(45) Date of Patent: May 15, 2018

(54) OPTICAL CONNECTOR, CABLE, AND OPTICAL COMMUNICATION DEVICE

(71) Applicant: SONY CORPORATION, Tokyo (JP)

(72) Inventors: Kazuyoshi Suzuki, Tokyo (JP);
Kazumoto Kondo, Kanagawa (JP);
Kazuaki Toba, Kanagawa (JP);
Yasuhisa Nakajima, Kanagawa (JP);
Satoshi Miyazaki, Kanagawa (JP);
Masanari Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/118,340

(22) PCT Filed: Jan. 9, 2015

(86) PCT No.: PCT/JP2015/050491
§ 371 (c)(1),
(2) Date: Aug. 11, 2016

(87) PCT Pub. No.: WO2015/133164
PCT Pub. Date: Sep. 11, 2015

(65) Prior Publication Data
US 2017/0184795 A1 Jun. 29, 2017

(30) Foreign Application Priority Data
Mar. 6, 2014 (JP) .................. 2014-043734

(51) Int. Cl.
*G02B 6/32* (2006.01)
*G02B 6/42* (2006.01)
*G02B 6/38* (2006.01)

(52) U.S. Cl.
CPC .............. *G02B 6/32* (2013.01); *G02B 6/3853* (2013.01); *G02B 6/4292* (2013.01)

(58) Field of Classification Search
CPC ....... G02B 6/32; G02B 6/3853; G02B 6/4292
See application file for complete search history.

(56) References Cited

U.S. PATENT DOCUMENTS

| 4,265,511 | A | * | 5/1981 | Nicia | ............... G02B 6/32 385/33 |
| 4,636,030 | A | | 1/1987 | Carter et al. | |
| 4,641,915 | A | * | 2/1987 | Asakawa | ............ G02B 6/3604 385/26 |

(Continued)

FOREIGN PATENT DOCUMENTS

| JP | 59-211012 | 11/1984 |
| JP | 02-111086 | 4/1990 |

(Continued)

OTHER PUBLICATIONS

May 24, 2017, CN communication issued for related CN application No. 201580011240.4.

*Primary Examiner* — Daniel Petkovsek
(74) *Attorney, Agent, or Firm* — Paratus Law Group, PLLC

(57) ABSTRACT

A lens of a plug converts a light signal from an optical fiber cable to light of a predetermined divergence angle in order to emit the light. A plug housing fixes the optical fiber cable and the lens. The lens is positioned such that the light signal from the optical fiber cable becomes the light of the predetermined divergence angle at an emission surface side of the optical fiber cable. The light signal emitted from the plug becomes dispersed when entering into the eyeball of a nearby person, and therefore can be prevented from exerting adverse effect on visual function and the like.

7 Claims, 8 Drawing Sheets

(56) References Cited

U.S. PATENT DOCUMENTS

| | | | | |
|---|---|---|---|---|
| 4,690,487 A * | 9/1987 | Hale | .................. | G02B 6/325 |
| | | | | 385/74 |
| 4,732,452 A | 3/1988 | Carter | | |
| 4,786,135 A * | 11/1988 | Boero | .................. | G02B 6/32 |
| | | | | 385/59 |
| 4,798,428 A * | 1/1989 | Karim | .................. | G02B 6/32 |
| | | | | 385/74 |
| 4,889,406 A * | 12/1989 | Sezerman | ............ | G02B 6/3843 |
| | | | | 385/35 |
| 5,095,517 A * | 3/1992 | Monguzzi | ................ | G02B 6/32 |
| | | | | 250/227.11 |
| 5,300,063 A * | 4/1994 | Tano | .................. | A61F 9/00821 |
| | | | | 606/15 |
| 5,351,330 A * | 9/1994 | Jongewaard | ......... | G02B 6/4204 |
| | | | | 385/90 |
| 6,010,251 A * | 1/2000 | Koyanagi | ............ | G02B 6/4207 |
| | | | | 359/819 |
| 6,374,012 B1 * | 4/2002 | Bergmann | ............... | G02B 6/32 |
| | | | | 359/652 |
| 6,773,170 B1 * | 8/2004 | Georgiev | ............... | G02B 6/264 |
| | | | | 385/90 |
| 8,393,802 B2 * | 3/2013 | Stanley | ................ | G02B 6/3866 |
| | | | | 385/134 |
| 8,454,243 B2 * | 6/2013 | Hsu | .......................... | G02B 6/32 |
| | | | | 385/74 |
| 8,622,624 B2 * | 1/2014 | Bergann | .................. | G02B 6/32 |
| | | | | 385/33 |
| 9,025,917 B2 * | 5/2015 | Aoki | ....................... | G02B 6/32 |
| | | | | 385/33 |
| 9,557,489 B2 * | 1/2017 | Martelius | ............... | G02B 6/262 |
| 2005/0147347 A1 * | 7/2005 | Fluck | ..................... | G02B 6/327 |
| | | | | 385/33 |
| 2011/0200284 A1 * | 8/2011 | Zhovnirovsky | .......... | G02B 6/32 |
| | | | | 385/33 |

FOREIGN PATENT DOCUMENTS

| | | |
|---|---|---|
| JP | 04-309907 | 11/1992 |
| JP | 2000-147333 | 5/2000 |
| JP | 2014-137384 | 7/2014 |

* cited by examiner

OPTICAL CONNECTOR, CABLE, AND OPTICAL COMMUNICATION DEVICE

CROSS REFERENCE TO PRIOR APPLICATION

This application is a National Stage Patent Application of PCT International Patent Application No. PCT/JP2015/050491 (filed on Jan. 9, 2015) under 35 U.S.C. § 371, which claims priority to Japanese Patent Application No. 2014-043734 (filed on Mar. 6, 2014), which are all hereby incorporated by reference in their entirety.

TECHNICAL FIELD

The present technology relates to an optical connector, a cable, and an optical communication device, which prevent a light signal from exerting adverse effect on visual function and the like.

BACKGROUND ART

In optical communication that uses laser light, optical fiber cables have been connected by using an optical connector, for example. In a widely known optical connector, a lens for forming a light signal communicated between a plug and a receptacle into a collimated light is provided in one of the plug side and the receptacle side, and a lens for collecting the collimated light is provided in the other side. As described above, if the communication is performed between the plug and the receptacle by using the collimated light, optical communication can be performed without highly accurately positioning the end surface of the optical fiber cable at a predetermined interval to mutually face against light detection and the like, and the optical connector can be provided inexpensively.

Also, in Patent Literature 1, a movable shutter is provided in an end portion of an optical fiber cable. This shutter covers an end surface (an emission surface) of a light signal emission side of the optical fiber cable at a closed position. Thus, the emission surface can be protected from flaw, taint, and the like, and entrance of light into the optical fiber cable and the like can be blocked. Further, the shutter covers the emission surface of the optical fiber cable, and thereby the collimated light emitted from the emission surface of the optical fiber cable is prevented from entering into the eyeball of a nearby person and exerting adverse effect on visual function and the like.

CITATION LIST

Patent Literature

Patent Literature 1: JP 2000-147333A

SUMMARY OF THE DISCLOSURE

Technical Problem

By the way, when a shutter that covers an emission surface of a laser light is provided, a closed position is not reached due to abrasion and the like of the shutter, or the shutter is at open position because of cleaning and the like, in some cases. In these cases, the emission surface of a light signal is in an exposed state, and thus it is concerned that a collimated light enters into the eyeball of a nearby person.

Thus, in the present technology, a purpose is to provide an optical connector, a cable, and an optical communication device, which can prevent emission of a light signal that exerts adverse effect on visual function and the like.

Solution to Problem

According to a first aspect of the present technology, there is provided an optical connector including a lens configured to convert a light signal from a light transmission path or a light source to a predetermined divergence angle and emit the converted light signal, and a housing to which the lens is fixed and coupled to a connector at reception side of the light signal.

In the present technology, a light signal is converted to a predetermined divergence angle and is emitted, by a lens fixed to a housing coupled to a connector at reception side of the light signal. A predetermined divergence angle is converted to an angle at which the amount of light in a predetermined region at a position away from the lens by a predetermined distance is equal to or smaller than a preset amount of light, for example, a divergence angle of 10° or more. Alternatively, a predetermined divergence angle is converted to an angle at which an amount of decrease in the amount of light of the light signal received by the connector at reception side is equal to or smaller than a preset amount of light, within an attachment tolerance range when the housing is coupled to the connector at reception side, for example, a divergence angle of 20° or less. Also, the lens the light signal may convert to the light signal that has a predetermined divergence angle at a position away by a predetermined distance, by collecting to a position that is closer than a predetermined distance from the lens. The housing retains a light transmission path or a light source that emits the light signal to the lens, at a position where the light signal emitted from the lens has a predetermined divergence angle, in addition to the lens. For example, the light transmission path or the light source is retained at a position where an output position of the light signal is different from the focal point position of the lens.

According to a second aspect of the present technology, there is provided a cable including a lens configured to convert a light signal from an end surface of an optical fiber cable to a predetermined divergence angle and emit the converted light signal, and a housing coupled to a connector at reception side of the light signal by integrally fixing the optical fiber cable and the lens.

According to a third aspect of the present technology, there is provided a light communication device including a light signal output unit, a lens configured to convert a light signal from the light signal output unit to a predetermined divergence angle and emit the converted light signal, and a housing to which the lens is fixed and coupled to a connector at reception side of the light signal.

Effects

In the present technology, a lens that converts the light signal from the light transmission path or the light source to light of a predetermined divergence angle, and a housing to which the lens is fixed and which is coupled to the optical connector at reception side of the light signal are provided. Thus, the emitted light signal is dispersed when entering into the eyeball of a nearby person, and therefore is prevented from exerting adverse effect on visual function and the like. Note that the effects described in the present specification are just examples and are not limitative, and there may be additional effects.

DESCRIPTION OF EMBODIMENT(S)

In the following, a mode for carrying out the present technology will be described. Note that description will be made in the following order.
1. Configuration of Optical Communication System
2. Schematic Configuration of Optical Connector
3. First Operation of Optical Connector
4. Second Operation of Optical Connector
5. Another Operation of Optical Connector
<1. Configuration of Optical Communication System>

Figure 1:
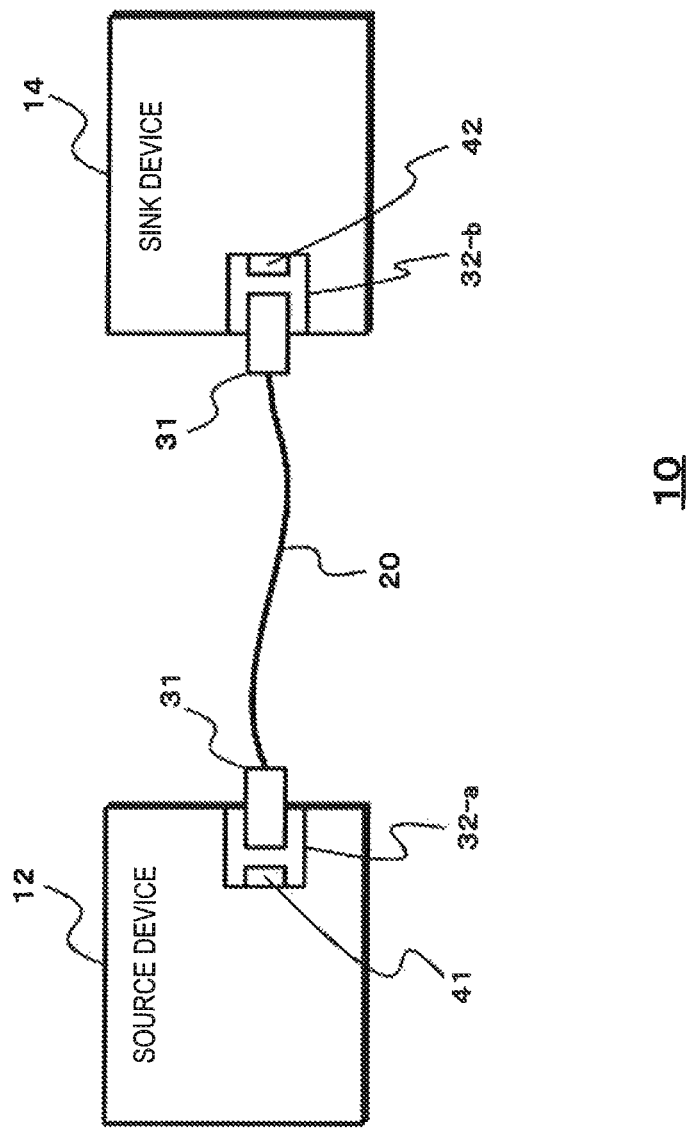
FIG. 1 is a diagram illustrating a configuration of an optical communication system.

FIG. 1 illustrates a configuration of an optical communication system that uses an optical connector of the present technology. In an optical communication system 10, a source device 12 which is an information transmission side and a sink device 14 which is an information reception side are connected via a light transmission path, for example an optical fiber cable 20.

The source device 12 is a device that can output video and audio content, information of computer data, and the like. For example, the source device 12 is a device such as a set-top box that receives a broadcast program, a program on demand, and the like, a reproduction device that reproduces video and audio content recorded in a recording medium, a server that stores information such as content and computer data, and an information transmitting device.

The sink device 14 receives information output from the source device 12, and is a device that performs a process to present the received information to a user and a process to record the received information in a recording medium and the like. For example, the sink device 14 is a device such as a video display device, an audio output device, a recording device, or an information receiving device.

In the optical communication system 10, an optical connector is used to connect the optical fiber cable 20 to the source device 12 and the sink device 14. The optical connector is configured with a plug 31 and a receptacle 32, and the plug 31 is attached to the receptacle 32 in an insertable and removable manner.

The plug 31 is provided at both ends of the optical fiber cable 20 for example, and the receptacle 32 is provided in each of the source device 12 and the sink device 14 for example. A light source 41 that emits laser light is provided in a receptacle 32-a of the source device 12, and a light detection unit 42 that converts a light signal to an electrical signal is provided in a receptacle 32-b of the sink device 14.

Here, as illustrated in FIG. 1, the plug 31 provided at one end of the optical fiber cable 20 is coupled to the receptacle 32-a of the source device 12, and the plug 31 provided at another end of the optical fiber cable 20 is coupled to the receptacle 32-b of the sink device 14. Further, the receptacle 32-a of the source device 12 emits a laser light modulated in accordance with the information to transmit as a light signal from the light source 41. As described above, if the transmitted information is transmitted as the light signal, communication can be performed between the source device 12 and the sink device 14 via the optical fiber cable 20, by the receptacle 32-b of the sink device 14 that collects the light signal to the light detection unit 42 and generates the electrical signal according to the light signal.

Note that the optical communication system 10 may include a configuration that transmits information relevant to the sink device 14 and the like to the source device via an optical fiber cable.
<2. Schematic Configuration of Optical Connector>

Figure 2:
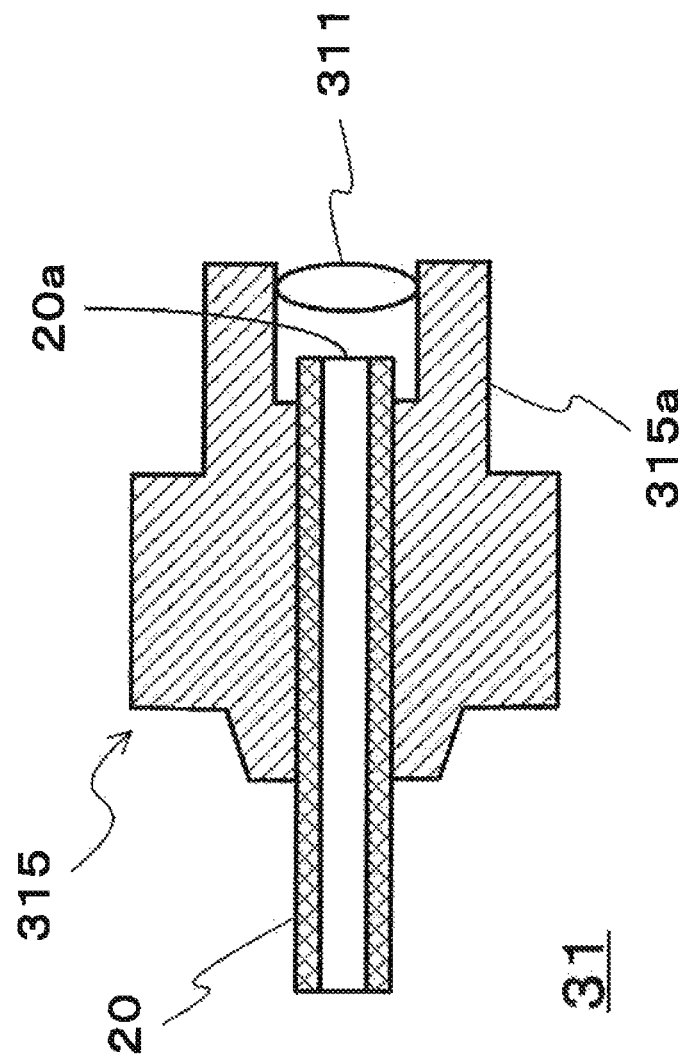
FIG. 2 is a diagram illustrating a schematic configuration of a plug that emits a light signal.
Figure 3:
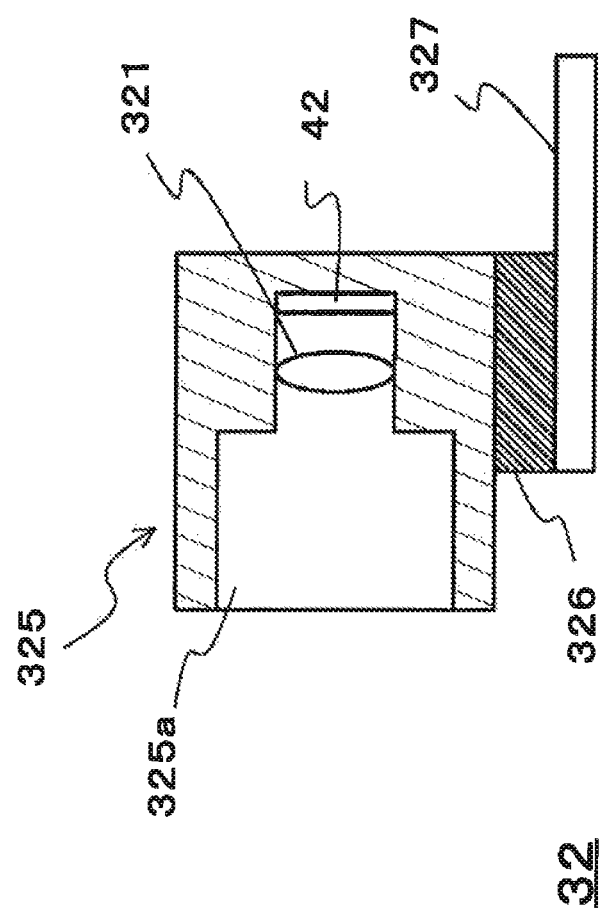
FIG. 3 is a diagram illustrating a schematic configuration of a receptacle into which a light signal enters.

FIG. 2 illustrates a schematic configuration of a plug that emits a light signal. Also, FIG. 3 illustrates a schematic configuration of a receptacle into which a light signal enters. Note that, in order to facilitate the understanding of the present technology, the below diagrams illustrate the housing, the optical fiber cable, and the like in cross-sectional views.

As illustrated in FIG. 2, the plug (the optical connector at transmission side) that emits the light signal includes a lens 311 and a plug housing 315.

The lens 311 is located at an end surface (emission surface) 20a side of a light signal emission side of the optical fiber cable 20, and emits by converting the light signal from the emission surface 20a of the optical fiber cable 20 to a predetermined divergence angle.

The plug housing 315 fixes and retains the optical fiber cable 20 and the lens 311 at a position where the light signal emitted from the lens 311 has a predetermined divergence angle. A fitting protrusion portion 315a is provided in this plug housing 315. The fitting protrusion portion 315a has a shape and a size corresponding to a fitting hole provided in the receptacle 32 which is a reception side of the light signal emitted via the lens 311, and is inserted into the fitting hole of the receptacle 32 when the plug 31 and the receptacle 32 are connected. That is, the plug 31 is configured to be coupled to the receptacle (optical connector at reception side) 32 in an insertable and removable manner.

As illustrated in FIG. 3, the receptacle (the optical connector at reception side) 32 into which the light signal enters includes a lens 321 and a receptacle housing 325, and a receptacle attachment portion 326 and a light detection unit 42.

The lens 321 is located at the light receiving surface side of the light detection unit 42, and collects the light signal that enters into the receptacle 32 to a light receiving surface of the light detection unit 42.

The receptacle housing 325 fixes the lens 321 and the light detection unit 42 in the above positional relationship. A fitting hole 325a is provided in this receptacle housing 325. The fitting hole 325a has a shape and a size corresponding to the fitting protrusion portion 315a of the plug housing 315, and the fitting protrusion portion 315a of the plug housing 315 is inserted when the plug 31 and the receptacle 32 are connected. That is, the receptacle 32 is configured such that the plug 31 is attached in an insertable and removable manner.

The receptacle attachment portion 326 mechanically and electrically connects the receptacle 32 to a reception side substrate 327. For example, the receptacle attachment portion 326 electrically connects the receptacle 32 to the reception side substrate 327, and inputs a signal generated by the light detection unit 42 into a circuit of the reception side substrate 327. Also, the receptacle attachment portion 326 mechanically connects the receptacle 32 to the reception side substrate 327, and fixes the receptacle housing 325 at a predetermined position of the reception side substrate 327.

<3. First Operation of Optical Connector>

In the optical connector configured as described above, when the light signal emitted from the plug 31 inserted into the receptacle 32 of the sink device 14 is a collimated light, an amount of attenuation of intensity of light according to distance is small, for example. Hence, it is concerned that adverse effect is exerted to visual function and the like, when entering into the eyeball of a person, even if away from the plug 31. Thus, the lens 311 of the plug 31 converts the light signal from the optical fiber cable 20 to the light of a predetermined divergence angle and emits the light, in order to disperse the light signal such that an amount of light in a predetermined region at a position away from the lens 311 by a predetermined distance is equal to or smaller than a preset amount of light.

Figure 4:
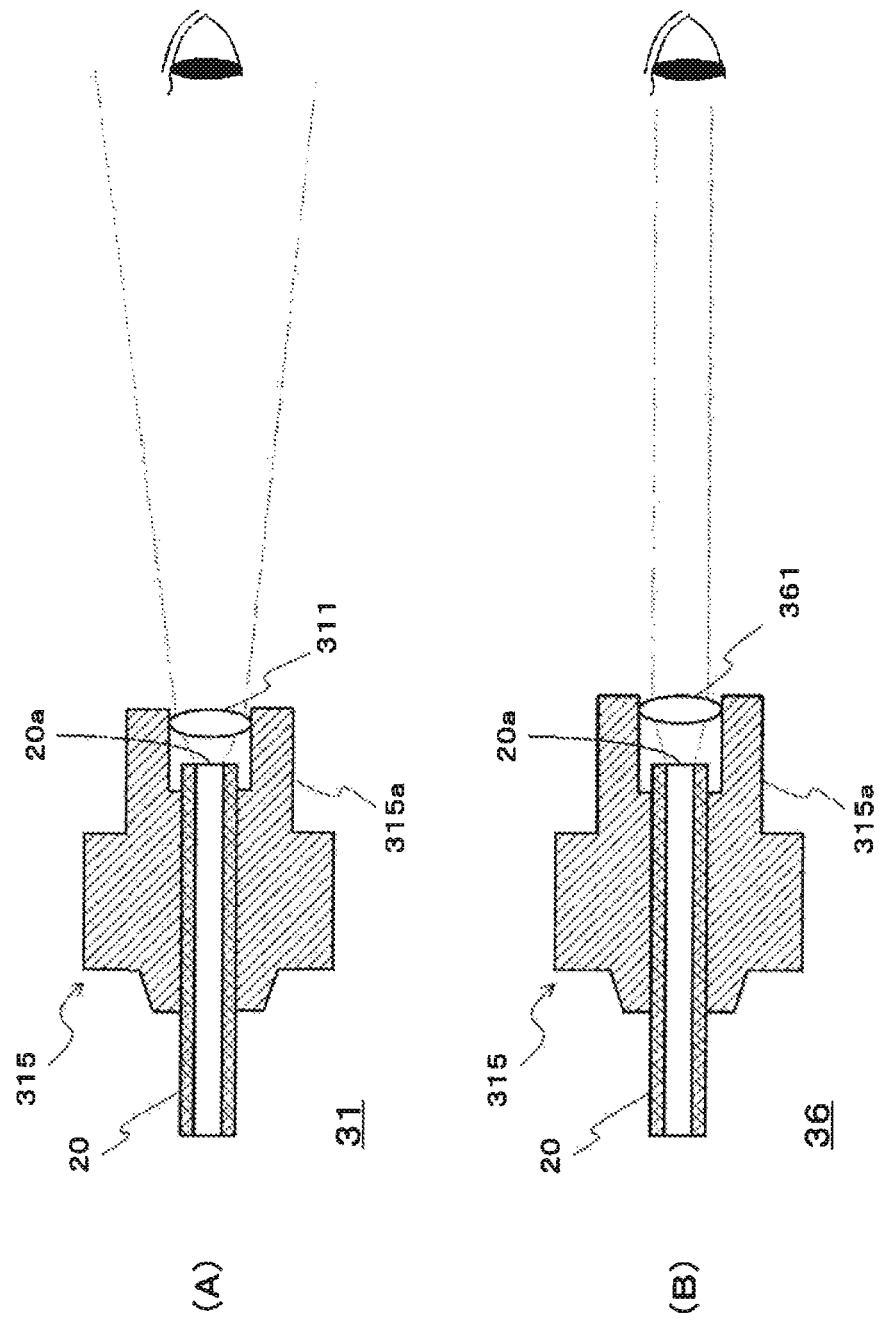
FIG. 4 is a diagram for describing a first operation of an optical connector.

FIG. 4 is a diagram for describing a first operation of the optical connector, and FIG. 4 (A) illustrates a case in which the light signal from the optical fiber cable 20 is converted to the light of a predetermined divergence angle by the lens 311. Note that, FIG. 4 (B) illustrates, as reference, a configuration of a plug of the past that converts the light signal from the optical fiber cable 20 to a collimated light, by using a collimator lens 361.

As illustrated in FIG. 4 (B), the amount of attenuation of the intensity of light according to the distance is small, in the plug 36 that emits by converting the light signal from the optical fiber cable 20 to the collimated light by using the collimator lens 361. Thus, it is concerned that the amount of light that enters into the eye is large, and adverse effect is exerted to the eye, even when the eye views the emitted light of the plug 36 at a position away from the plug 36.

However, as illustrated in FIG. 4 (A), the light signal is dispersed at the position away from the plug 31, when the light signal from the optical fiber cable 20 is converted to a predetermined divergence angle by the lens 311. That is, in the plug housing 315, the emission surface 20a of the optical fiber cable 20 is at a position different from the focal point position of the lens 311, for example, when a convex lens is used as the lens 311, the emission surface 20a is at a position closer to the lens than the focal point position of the lens 311. As described above, when the optical fiber cable 20 and the lens 311 are retained, the light signal from the optical fiber cable 20 is converted to a light signal that has a divergence angle. Thus, when the emitted light of the plug 31 is viewed with the eye at the position away from the plug 31, the light signal is dispersed, and thus the amount of light that enters into the eye is made smaller, and the bad influence is prevented.

A predetermined divergence angle is an angle at which an amount of light in a predetermined region at a position away from the lens 311 by a predetermined distance is equal to or smaller than a preset amount of light. For example, in the standard of IEC 60825-1/JIS C 6802, it is stipulated to limit the amount of light that enters into a diameter 7 mm corresponding to a pupil of a person at a distance 70 mm away from a light source, for example. Thus, the predetermined divergence angle is an angle at which the amount of light in a predetermined region is equal to or smaller than a preset amount of light at a position away from the lens 311 by a predetermined distance for example, in order to satisfy this standard.

Figure 5:
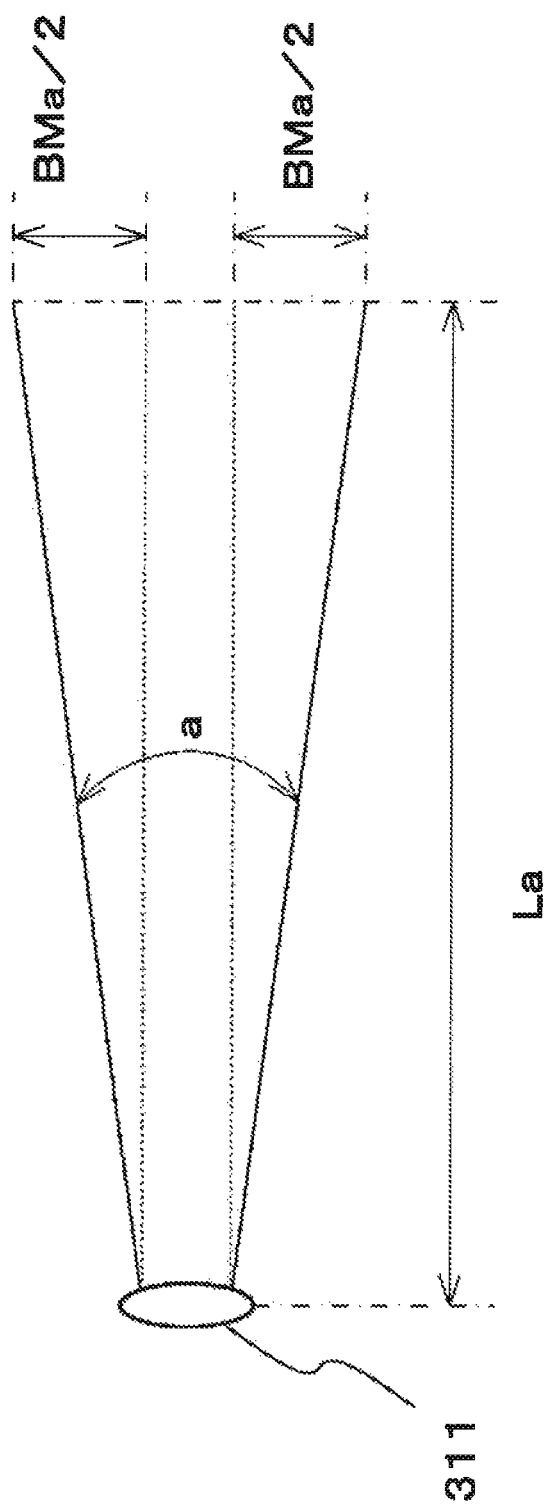
FIG. 5 is a diagram illustrating a case in which an emitted light from a plug has a divergence angle.

FIG. 5 illustrates a case in which the light signal from the plug has a divergence angle. Where the divergence angle of the light signal emitted via the plug 31 is angle a, the beam diameter of the light signal is broadened by BMa on the basis of an equation (1) at a position away by a distance La.

$$(La \times \sin(a/2)) \times 2 = BMa \quad (1)$$

That is, if the angle a is small, broadening of the beam diameter is small, and thus the lens 311 converts the light signal such that the divergence angle is equal to or larger than 10°.

As described above, the light signal from the optical fiber cable is converted to a divergence angle of a predetermined divergence angle, for example 10° or more, and is emitted, and thereby even with the emission surface of the light signal being exposed, adverse effect due to the light signal entering into the eye can be prevented. Thus, it is not necessary to provide a shutter to block the light signal.

Figure 6:
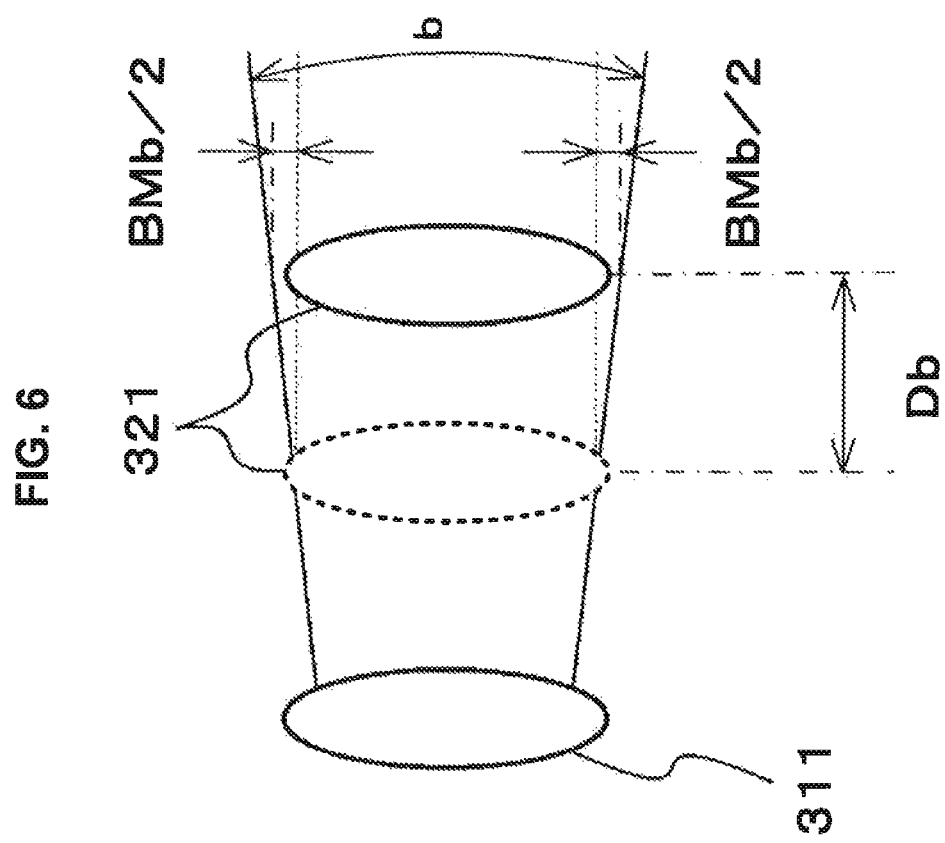
FIG. 6 is a diagram illustrating a case in which error occurs in attachment between a plug and a receptacle.

By the way, when the divergence angle is large, attachment error between the plug 31 and the receptacle 32 must be small. FIG. 6 illustrates a case in which error occurs in attachment between the plug 31 and the receptacle 32.

If error Db occurs in the interval of the lens 311 and the lens 321 when the plug 31 is attached to the receptacle 32, the beam diameter of the light signal that enters into the lens 321 increases by BMb on the basis of equation (2).

$$(Db \times \sin(b/2)) \times 2 = BMb \quad (2)$$

Note that, in FIG. 6, the position of the lens 321 illustrated by a dashed line indicates a correct lens position, and the position of the lens 321 illustrated by a solid line indicates a lens position where error occurs.

That is, when the angle b is large, the beam diameter of the light signal becomes larger than the lens 321 due to the attachment error, and it is concerned that the amount of light of the light signal collected to the light detection unit decreases. Thus, a predetermined divergence angle is an angle at which the amount decrease in the amount of light of the light signal received by the receptacle 32 is equal to or smaller than a preset amount of light, within the attachment tolerance range when coupled to the plug 31 and the receptacle 32. For example, the lens 311 converts the light signal such that the divergence angle is 10° or more and 20° or less.

Figure 7:
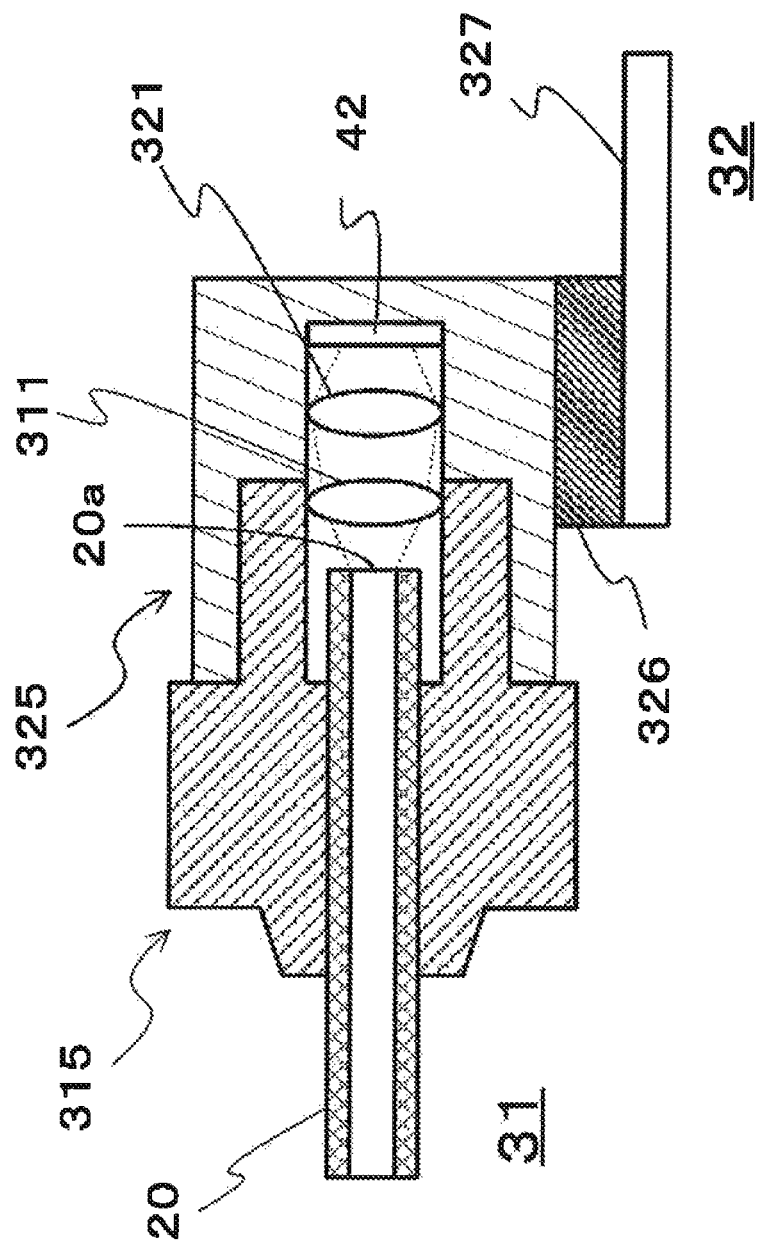
FIG. 7 is a diagram illustrating a case in which a plug is coupled to a receptacle.

As described above, the plug 31 emits and converts the light signal to a predetermined divergence angle, for example a divergence angle of 10° or more and 20° or less by means of the lens 311. Hence, when the plug 31 is attached to the receptacle 32 as illustrated in FIG. 7, the light signal enters into the lens 321 of the receptacle 32 without the beam diameter of the light signal emitted from the plug 31 becoming excessively large even if attachment error occurs. Thus, preferable optical communication can be performed robustly. Note that the effect obtained by the first operation of the optical connector is illustrative, and is not limited to the above effect, but other effects may be obtained.

<4. Second Operation of Optical Connector>

By the way, the light signal emitted from the plug 31 is not limited to a configuration that emits and diverges the light signal from the plug 31 like the above first operation, if the light signal is diverged at a viewing position.

Next, in a second operation, a case in which the emitted light from the plug 31 is collected at a position adjacent to the lens 311, to create a light signal that has a predetermined divergence angle at a predetermined distance is illustrated, for example.

Figure 8:
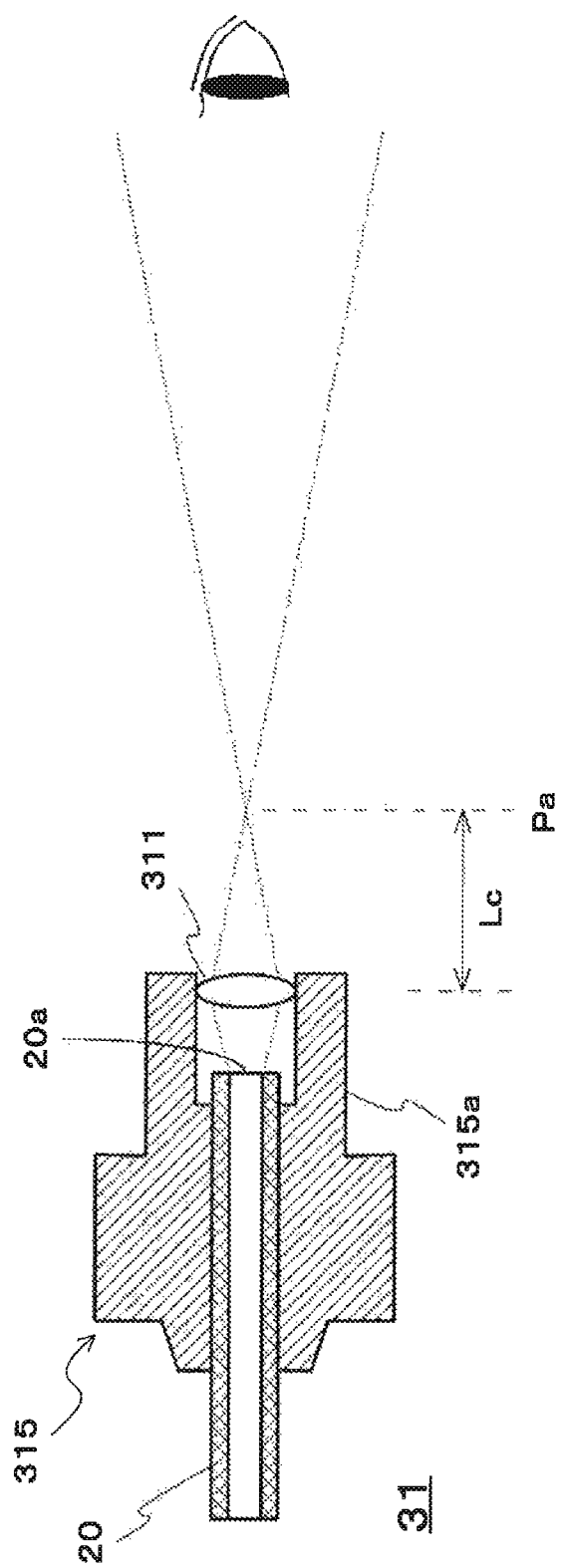
FIG. 8 is a diagram for describing a second operation of an optical connector.

FIG. 8 is a diagram for describing the second operation of the optical 26 connector. The light signal emitted from the lens 311 of the plug 31 is collected to a position Pa adjacent to the lens 311. That is, in the plug housing 315, the emission surface 20a of the optical fiber cable 20 is at a position different from the focal point position of the lens 311, for example the emission surface 20a is at a position more remote from the lens 311 than the focal point position of the lens 311, when a convex lens is used as the lens 311. As described above, by fixing and retaining the optical fiber cable 20 and the lens 311, light is more dispersed than the light signal emitted from the lens 311 at a position more remote from the position Pa than a distance Lc from the lens 311 to the position Pa.

Thus, the light signal emitted from the lens 311 is collected at a position closer than a predetermined distance, such that the amount of light in a predetermined region at a position away by a predetermined distance is a diverging light having a preset amount of light or less. In this way, when the emitted light of the plug 31 is viewed with the eye at a position away from the plug 31, the light signal is dispersed, and thus the amount of light that enters into the eye is small, and bad influence is prevented.

Further, the light signal is collected to an adjacent position, and therefore, if the light collection position is more remote than the lens 321 of the receptacle 32, dispersion of the light signal is made smaller as compared with the first operation, even if an attachment error occurs when the plug 31 is coupled to the receptacle 32. Note that the effect obtained by the second operation of the optical connector is illustration, and is not limited to the above effect, but other effects may be obtained.

<5. Another Operation of Optical Connector>

Also, in above first and second operations, a case in which the lens 311 of the plug 31, which is the transmission side optical connector, emits and converts the light signal from the optical fiber cable 20 to a predetermined divergence angle has been described. However, the conversion to the light signal of a predetermined divergence angle is not limited to a plug, but may be performed by the receptacle. For example, the light signal from the light source is emitted and converted to a predetermined divergence angle, by the lens of the receptacle, with the receptacle provided in the source device as the transmission side connector. Also, in the plug which is the optical connector at reception side, the lens collects the light signal to the end surface (the entrance surface of the light signal) of the optical fiber cable.

As described above, when the lens of the receptacle provided in the source device emits and converts the light signal from the light source to a predetermined divergence angle, the light signal from the source device is prevented from entering into the eye and generating adverse influence, with the plug of the light cable disconnected to the source device.

Also, the optical connector provided with the lens that emits and converts the light signal to a predetermined divergence angle may be separately provided from the optical fiber cable, and may be provided as an optical fiber cable into which the optical connector is integrated.

Further, in the optical connector of the above embodiment, a case in which the light signal emission surface of the plug and the light signal entrance surface of the receptacle are configured to face each other has been illustrated, a light path conversion element, for example a mirror and the like, may be provided between the light signal emission surface and the light signal entrance surface. In this case, the light signal emission surface and the light signal entrance surface are able to be at a predetermined angle, and the degree of freedom of direction, shape, and the like of the optical connector can be increased.

Note that the present technology should not be interpreted as being limited to the embodiments described above. The embodiments disclose the present technology in a form of illustration, and it is obvious that a skilled person can achieve modification and substitution of the embodiments within a scope that does not depart from the spirit of the present technology. That is, the claims should be referred to determine the scope of the present technology.

Further, the optical connector according to the present technology can also be configured as follows.

(1)

An optical connector including:

a lens configured to convert a light signal from a light transmission path or a light source to a predetermined divergence angle and emit the converted light signal; and a housing to which the lens is fixed and coupled to a connector at reception side of the light signal.

(2)

The optical connector according to (1), wherein the predetermined divergence angle is an angle at which an amount of light in a predetermined region at a position away from the lens by a predetermined distance is equal to or smaller than a preset amount of light.

(3)

The optical connector according to (2), wherein the lens converts the light signal to a divergence angle of 10° or more.

(4)

The optical connector according to (2), wherein the predetermined divergence angle is an angle at which an amount of decrease in an amount of light in a light signal received by the connector at reception side is equal to or smaller than a preset amount of light, within an attachment tolerance range when the housing is coupled to the connector at reception side.

(5)

The optical connector according to (4), wherein the lens converts the light signal to a divergence angle of 20° or less.

(6)

The optical connector according to (2) or (3), wherein the lens converts the light signal to a light signal that has the predetermined divergence angle at a position away by the predetermined distance, by collecting the light signal to a position closer than the predetermined distance from the lens.

(7)

The optical connector according to any one of (1) to (6), wherein the housing retains the light transmission path or the light source that emits the light signal to the lens, at a position at which the light signal emitted from the lens has the predetermined divergence angle.

(8)

The optical connector according to (7), wherein, in the housing, an emission position of a light signal of the light transmission path or the light source is at a different position from a focal point position of the lens.

Industrial Applicability

In the optical connector, the cable, and the optical communication device of the present technology, the lens that converts the light signal from the light transmission path or the light source to the light of a predetermined divergence angle, and the housing to which the lens is fixed and which is coupled to the optical connector at reception side of the light signal are provided. Hence, the emitted light signal is dispersed when entering into the eyeball of a nearby person, and therefore is prevented from exerting adverse effect on visual function and the like. Thus, for example, suited for an optical communication system that connects a device that transmits video and audio content, information of computer data, and the like, and a device that receives and processes the transmitted video and audio content, the information of computer data, and the like, with an optical fiber cable.

REFERENCE SYMBOLS LIST 10 optical communication system
12 source device
14 sink device
20 optical fiber cable
20a emission surface
31, 36 plug
32, 32-a, 32-b receptacle
41 light source
42 light detection unit
311, 321 lens
315 plug housing
315a fitting protrusion portion
325 receptacle housing
325a fitting hole
326 receptacle attachment portion
327 reception side substrate
361 collimator lens

The invention claimed is:

1. An optical connector comprising:
   a lens; and
   a housing to which the lens is fixed and coupled to a connector at a reception side of a light signal,
   wherein the lens is configured to convert the light signal from a light transmission path or a light source to have a predetermined divergence angle of 10° or more, which is an angle for which an amount of
   decrease in an amount of light received by the connector at the reception side due to attachment error when the housing is coupled to the connector at the reception side is within an attachment tolerance range.

2. The optical connector according to claim 1, wherein the lens converts the light signal to a divergence angle of 20° or less.

3. The optical connector according to claim 1, wherein the lens converts the light signal to the converted light signal that has the predetermined divergence angle at a position a predetermined distance away from the lens, by collecting the light signal to a position closer than the predetermined distance from the lens.

4. The optical connector according to claim 1, wherein the housing retains the light transmission path or the light source that emits the light signal to the lens, at a position at which the light signal emitted from the lens has the predetermined divergence angle.

5. The optical connector according to claim 1, wherein, in the housing, an emission position of the light signal of the light transmission path or the light source is at a different position from a focal point position of the lens.

6. A cable comprising:
   a lens; and
   a housing coupled to a connector at a reception side of a light signal by integrally fixing a optical fiber cable and the lens,
   wherein the lens is configured to convert the light signal from an end surface of the optical fiber cable to have a predetermined divergence angle of 10° or more, which is an angle for which an amount of
   decrease in an amount of light received by the connector at the reception side due to attachment error when the housing is coupled to the connector at the reception side is within an attachment tolerance range.

7. A light communication device comprising:
   a lens;
   a light signal output unit; and
   a housing to which the lens is fixed and coupled to a connector at a reception side of a light signal,
   wherein the lens is configured to convert the light signal from the light signal output unit to have a predetermined divergence angle of 10° or more, which is an angle for which an amount of
   decrease in an amount of light received by the connector at the reception side due to attachment error when the housing is coupled to the connector at the reception side is within an attachment tolerance range.

* * * * *